(No Model.)

J. H. HENDY.
HYDRAULIC GIANT.

No. 547,074. Patented Oct. 1, 1895.

Witnesses.

Inventor.
John H. Hendy,
by Spear & Seely
Attorneys

UNITED STATES PATENT OFFICE.

JOHN H. HENDY, OF SAN FRANCISCO, CALIFORNIA.

HYDRAULIC GIANT.

SPECIFICATION forming part of Letters Patent No. 547,074, dated October 1, 1895.

Application filed June 12, 1895. Serial No. 552,586. (No model.)

*To all whom it may concern:*

Be it known that I, JOHN H. HENDY, a citizen of the United States, residing at San Francisco, in the county of San Francisco and State of California, have invented certain new and useful Improvements in Hydraulic Giants; and I do hereby declare that the following is a full, clear, and exact description thereof.

My invention relates to the monitors or giants used in hydraulic-mining operations, and more particularly to an improvement in the bearings for the rotary or swiveled parts of such a monitor, by the adjustment of which the direction of the stream of water can be changed.

The object of my invention is to provide a bearing of an antifrictional character especially adapted to this class of apparatus, by means of which the adjustment of the nozzle-pipe is facilitated and more easily accomplished. When the monitor is in use the enormous pressure of the water passing through the elbow is exerted in an upward direction and against the upper bearing, upon which the nozzle is horizontally adjusted. The friction thus created in the ordinary bearings is so great that their adjustment becomes exceedingly difficult, and it is the purpose of my invention to obviate this defect, which, so far as I am aware, is found in all monitors as at present constructed.

My invention is shown and will be described as applied to the horizontal bearing between the water-supply pipe and the elbow which connects the supply-pipe to the nozzle, by which bearing the horizontal direction of the nozzle can be changed at will.

Figure 1:
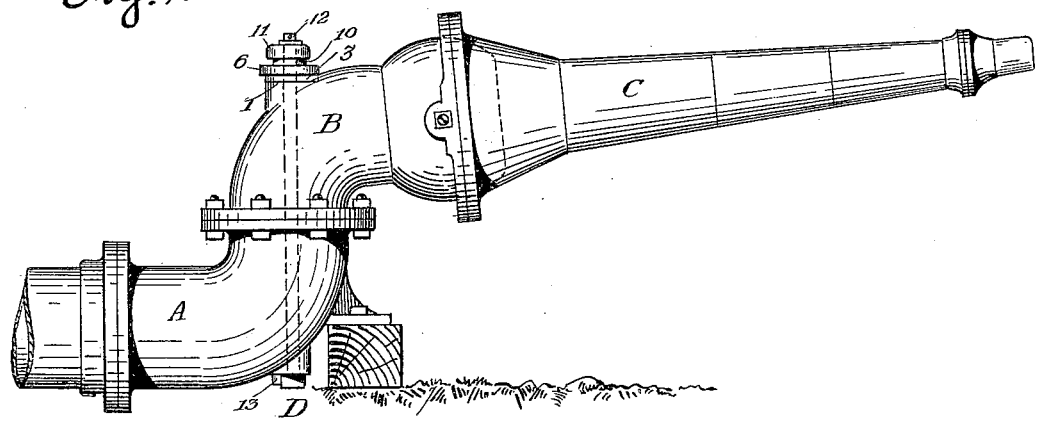
Figure 2:
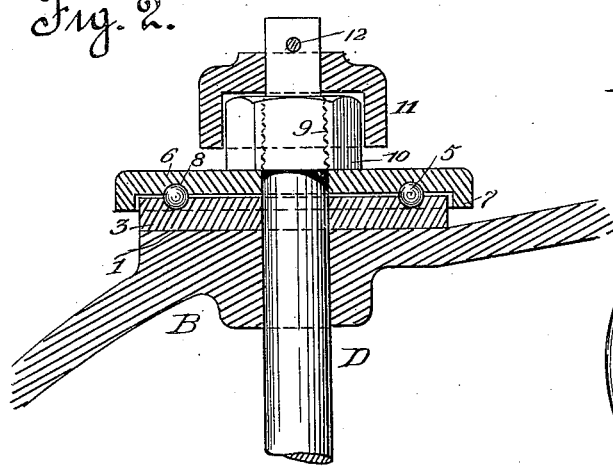
Figure 3:
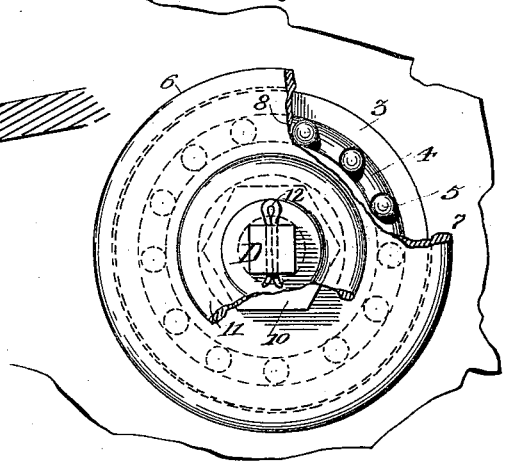

In the drawings, Figure 1 is a side elevation of a hydraulic giant in position. Fig. 2 is a vertical longitudinal section of the upper bearing or swivel for the elbow, showing my improved bearing applied thereto. Fig. 3 is a plan view of the same, partly broken away.

A represents the water-supply pipe having an upturned flanged end which is removably bolted to a similar flange on the curved elbow B. The elbow is formed with a ball, (dotted lines in Fig. 1,) upon which the nozzle C is adjustable for vertical elevation. The whole nozzle and the elbow B are adjustable horizontally after the bolts which secure the flanges are removed, the elbow turning on the end of the supply-pipe, which forms the lower bearing for it. The pipes A and B are drawn together and held in close contact by a vertical rod or bolt D, which passes through both pipes and projects above the pipe B. A flat surface 1 is formed on the elbow B to provide a seat for the upper bearing, on which the elbow turns. A plate 3 upon the seat has a circular groove or channel 4, which holds the balls 5 and forms half of the bearing. I prefer to use the plate 3; but it is evident that the groove 4 might be made in the face of the seat 1 instead. The other part of the bearing is a plate 6, having a circular lip 7, which incloses the plate 3 and keeps the two plates in position. A similar and coincident groove 8 is formed in the plate 6, and the balls, as many of which may be used as may be necessary, are held in the complete circular channel formed by the two grooves. The rod D passes through both plates and is threaded, as shown at 9, to receive the nut 10, by which the bearing-plates are drawn together upon the balls. The nut is held in position by a cap 11, which is slipped upon the rod D and incloses the nut, a pin 12 being passed through the rod above the cap. The upper end of the rod is preferably squared to fit a square hole in the cap. The rod D is held stationary by a stud 13, which bears upon the square head 14 of such rod at its lower end.

In adjusting the elbow and nozzle horizontally after the bolts which secure them to the supply-pipe are removed the elbow swings upon the stationary rod D and upon the ball-bearing. The balls keep the bearing-plates out of actual contact, and hence they can never become set by rusting or other cause, while the friction ordinarily produced by the contact of these heavy parts is to a very great extent relieved by the presence of the balls in the groove.

What I claim is—

1. In a hydraulic giant and in combination, a supply pipe, an adjustable elbow bolted thereto, a rod passing through said pipe and elbow, and an antifriction bearing surrounding said rod, substantially as described.

2. In a hydraulic giant and in combination, a supply pipe, an adjustable elbow bolted thereto, a rod passing through said pipe and elbow, an external grooved seat on the elbow, a grooved bearing plate on said rod adjacent to said seat, balls in said grooves, and a nut on the rod adapted to bear on said plate, all constructed and arranged to form an external anti-friction bearing for the elbow while being adjusted on the supply pipe, substantially as described.

3. In a hydraulic giant and in combination, a water pipe having an upturned end, an elbow bolted thereto, and universally jointed to a nozzle, a vertical rod connecting the water pipe and the elbow, and an external ball-bearing upon said rod and above the elbow, substantially as described.

In testimony whereof I have affixed my signature, in presence of two witness, this 30th day of April, 1895.

JOHN H. HENDY.

Witnesses:
G. W. HENDY,
GEO. T. BALCH.